J. H. STANFIELD.
CHERRY SEEDER OR PITTER.
APPLICATION FILED MAY 15, 1908.
1,093,361.
Patented Apr. 14, 1914.
3 SHEETS—SHEET 2.
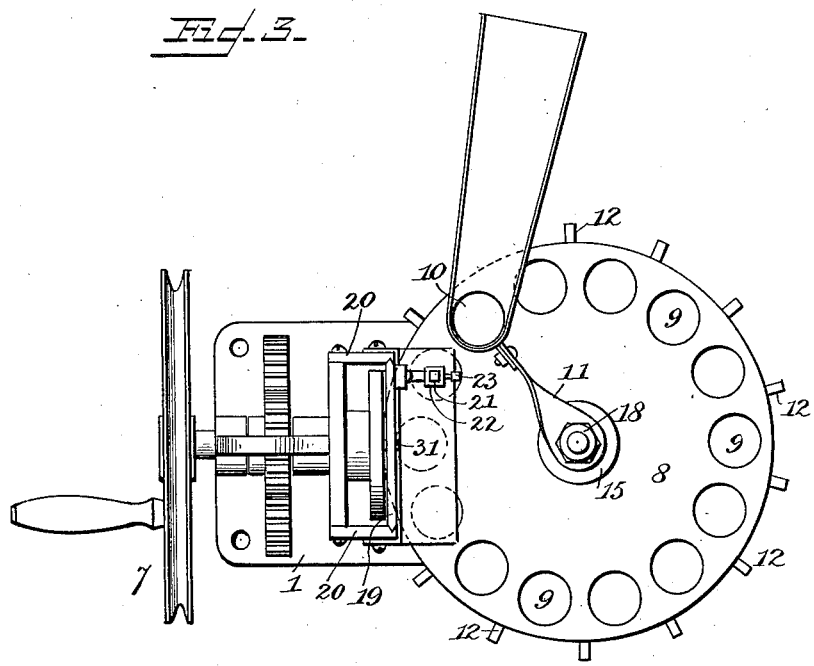
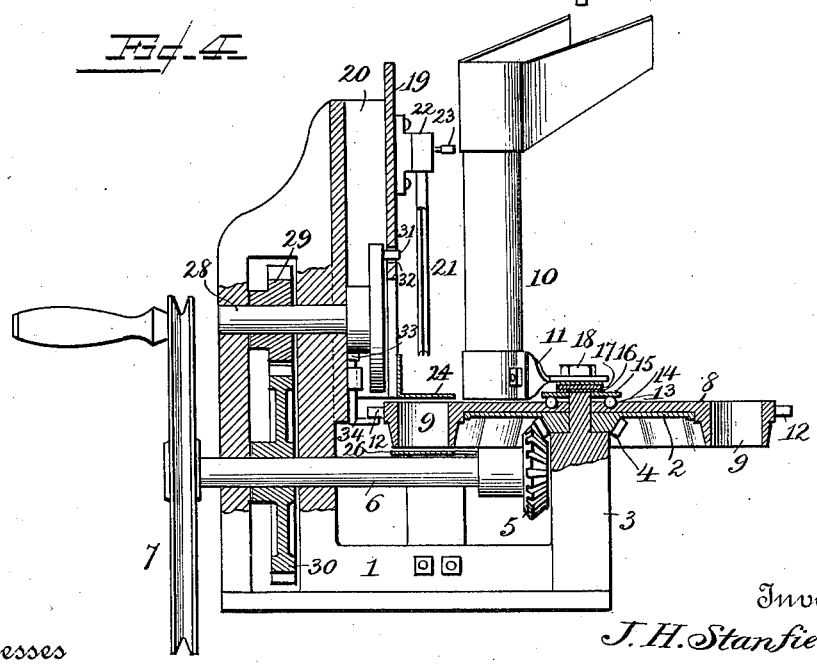

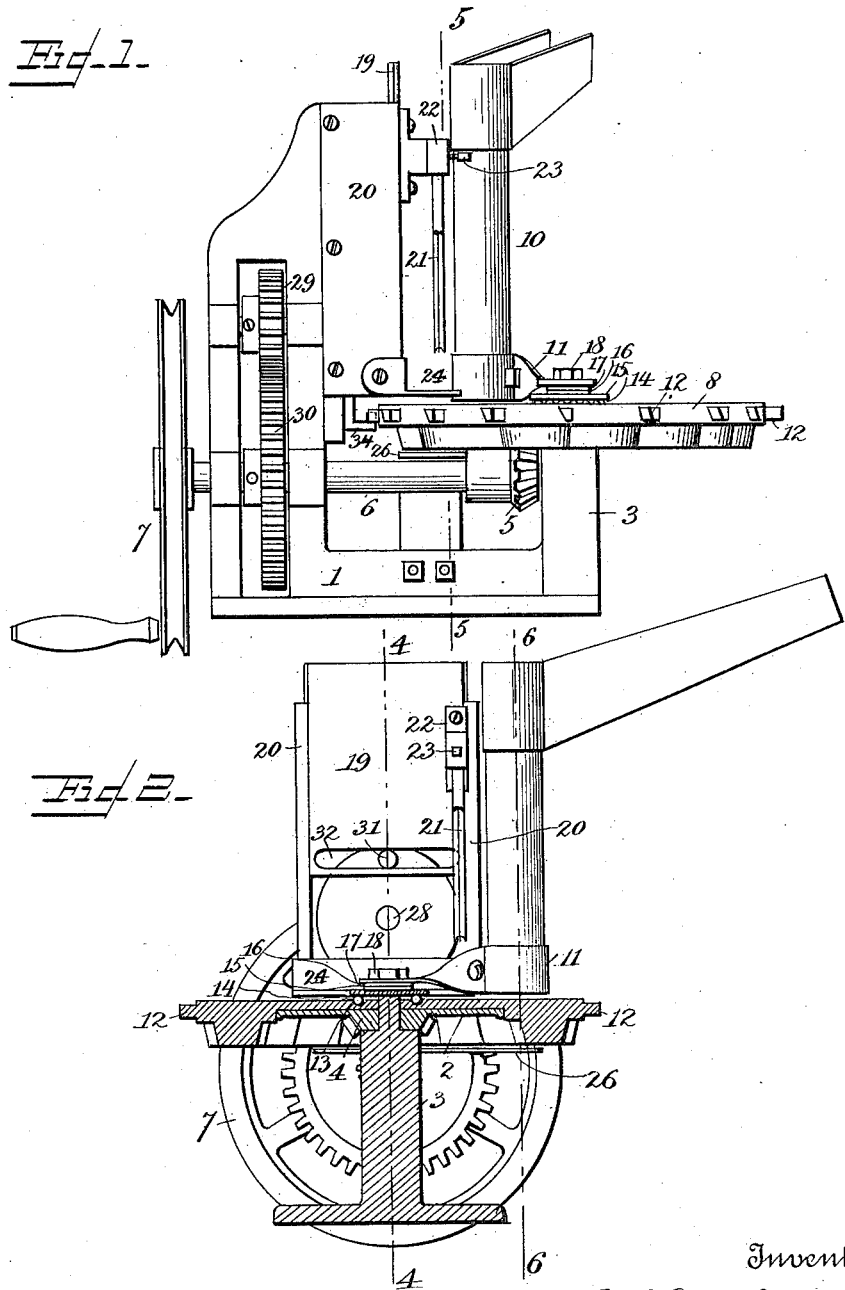

J. H. STANFIELD.
CHERRY SEEDER OR PITTER.
APPLICATION FILED MAY 15, 1908.

1,093,361.

Patented Apr. 14, 1914.
3 SHEETS—SHEET 3.

Witnesses
F. L. Ourand
C. H. Griesbauer

Inventor
J. H. Stanfield
By H. B. Willson & Co.
Attorneys

UNITED STATES PATENT OFFICE.

JASPER H. STANFIELD, OF MUSKEGON, MICHIGAN, ASSIGNOR OF ONE-HALF TO MICHIGAN WASHING MACHINE COMPANY, OF MUSKEGON HEIGHTS, MICHIGAN, AND ONE-FOURTH TO WILLIAM H. BOZELL, OF MUSKEGON, MICHIGAN.

CHERRY SEEDER OR PITTER.

1,093,361. Specification of Letters Patent. Patented Apr. 14, 1914.

Application filed May 15, 1908. Serial No. 433,053.

*To all whom it may concern:*

Be it known that I, JASPER H. STANFIELD, a citizen of the United States, residing at Muskegon, in the county of Muskegon and State of Michigan, have invented certain new and useful Improvements in Cherry Seeders or Pitters; and I do declare the following to be a full, clear, and exact description of the invention, such as will enable others skilled in the art to which it appertains to make and use the same.

My invention relates to improvements in machines for pitting or seeding cherries.

It has for its object to provide for readily and effectively removing the seeds from cherries with facility and without marring the fruit. Also to provide simple and expeditious means for effecting that end.

With these and other objects in view, the invention consists of certain novel features of construction, combination and arrangement of parts as will be described and particularly pointed out in the appended claims.

Figure 5:
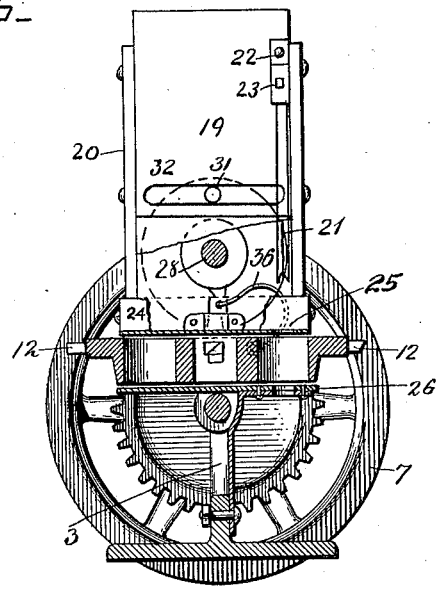
Figure 6:
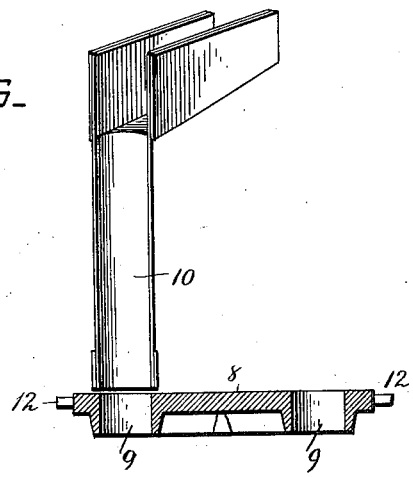

In the accompanying drawings, illustrating the preferred embodiment of my invention, Figure 1 is a side elevation thereof; Fig. 2 is a vertical transverse sectional view of the same; Fig. 3 is a plan view thereof; Fig. 4 is a vertical sectional view produced on the line 4—4 of Fig. 2; Fig. 5 is a similar sectional view produced on the line 5—5 of Fig. 1; and Fig. 6 is a corresponding sectional view taken on the line 6—6 of Fig. 2.

In carrying out my invention, I provide a suitable supporting frame, 1, for the operative parts of the machine. A carrying plate or disk, 2, is suitably journaled upon a stud or upright, 3, of the base plate of said supporting frame, said carrying plate being provided with a bevel toothed ring or pinion 4, upon its under side, with which is geared a corresponding pinion, 5, on a shaft, 6, suitably journaled in position in the frame, 1. Said shaft is equipped with a power or manually-actuated wheel, 7. Upon the carrying plate 2 is arranged a like plate or disk, 8, provided with a series of closely-arranged cells or openings, 9, preferably of annular outline, and suitably arranged for delivery into any one of said cells or pockets is a spout or tube, 10, the function of which will presently be seen. Said spout is secured in position by means of a bracket or arm, 11, fastened to an upward extension from a stud or upright, 3, as will be readily seen. Said plate or disk is also provided with a series of perimetric studs 12 suitably spaced apart, the function of which will also presently appear.

The carrying plate or disk 8 is arranged or superposed with relation to the rotating carrying plate, 2. Said plate 8 is provided with a race, 13, containing a series of ball-bearings, 14, and over this is arranged a washer, 15, pivoted on the upward extension of the stud or upright, 3, and upon this latter washer is arranged a second or soft rubber washer, 16, and upon said second washer is placed a third washer, 17, of suitable thin material, the whole being capped by a nut, 18, screwed upon the upper end of said stud or upright, 3, and also over the arm of the bracket, 11, delivering just sufficient pressure upon the aforesaid arrangement of washers and ball bearings to provide for a frictional contact between the plates 2 and 8, the latter plate being driven by friction.

A slide, 19, is arranged between lateral plates or uprights, 20, suitably secured in place on the supporting frame, 1, and adapted to effect the retention of said slide in position, and which slide carries a pitter or needle, 21, the latter being directly held in the aperture or socket of a bracket, 22, fixed on said slide, the retention of said needle or pitter being accomplished preferably by means of a set screw, 23.

A stripping plate, 24, is suitably secured to the side plates between which the slide, 19, is arranged, said stripping plate being arranged contiguous to the cell-equipped plate, 8, and has an opening, 25, therein through which passes the pitter or needle, 21, as the latter performs its reciprocating action. Also arranged below the plate 2 is a second plate, 26, having substantially the same radius as said plate 2, and also has an opening, 27, therein through which the seed or stone of the cherry is finally forced by the needle or pitter in performing that function, said plate being suitably supported in position upon the frame, 1, and from which opening, in practice, extends the spout for delivering the seed oppositely to the direction in which the cherry or fruit is delivered. Said plate, 26, is arranged relatively at a point in vertical alinement with the feeding spout, 10, beneath one of the pockets of cell plate, 8, and has its opening arranged in the path of the needle or pitter, said opening being just large enough for the passage therethrough of the seed of the cherry, or fruit.

A crank shaft, 28, is suitably journaled in position in the upright member of the supporting frame, 1, and intergeared as at 29 and 30 with the shaft of the carrying plate 2, which crank shaft has its crank member provided with a pin, 31, engaging a transverse slot, 32, in the slide, 19, by the action of which it will be seen that a vertical reciprocating motion is transmitted to said slide, as in actuating the needle or pitter, 21. The hub of said crank shaft is provided with a stud or cam, 33, adapted to engage a dog, 34, suitably supported in a bracket on the frame, 20, said dog being held under stress or pressure preferably by a flat spring, 35, also suitably secured at one end to said frame. Said dog is preferably of general right-angled outline having its lower arm provided with a slightly upstanding beveled portion, 36, for engagement with any one of the series of perimetric studs of the plate, 8, as in intermittently actuating the latter, as will subsequently be seen. It will also be noted that the cross sectional area of any of the pockets of the carrying plate, 8, is just sufficient to receive a single cherry, and that the spout for feeding said cells or pockets of said plate is designed to be kept filled with cherries, and that only one cherry at a time may pass from under it, while said pocket-equipped plate is to be of a thickness slightly less than the diameter of a cherry.

In operation, the machine is suitably actuated by turning the hand or power-driven wheel, when the needle or pitter will cut into the alined cherry, forcing the seed thereof downwardly through the hole in said plate upon plate 26, and that as the needle or pitter rises, the stripper, 24, will prevent the cherry rising with said needle, said cherry remaining on the plate, 26. When the needle or pitter rises to a point just above the stripper, the cam of the crank shaft will depress the dog, 34, sufficiently to allow the engaging perimetric stud of the carrying plate, 8, to become disengaged therefrom, said plate then revolving by means of frictional contact with the gear actuated plate 2 to a point coincident with the following pocket of the plate, 8. The cherry which has been pitted is conducted along the plate, 26, until it passes the end of said plate, when said cherry will drop into a suitable receptacle conveniently placed to receive the same, denuded of its seed or stone. As above stated, a suitable spout is arranged beneath the hole in the plate, 26, to suitably conduct away the seed.

It will be noted that the above described parts disclose a machine which is quite simple in its organization, effective in operation and expeditious in action, which are desiderata.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. In a device of the kind described, a stationary spindle, a rotatable carrier mounted upon said spindle, mechanism for continuously rotating said carrier, and a cell plate provided with a plurality of apertures supported by and frictionally engaging said carrier, in combination with means controlled by said rotating mechanism for periodically engaging said cell plate to stop the plate and momentarily control the position of said apertures.

2. In a device of the kind described, a rotatable carrier, mechanism for continuously rotating said carrier, and a cell plate provided with a plurality of apertures, supported by and frictionally engaging said carrier, and adjustable resilient and stationary means for controlling the frictional engagement between said cell plate and said carrier, in combination with means controlled by said rotating mechanism for periodically engaging said cell plate to stop the plate and momentarily control the position of said apertures.

3. In a device of the kind described, a stationary spindle, a rotatable carrier mounted upon said spindle, mechanism for continuously rotating said carrier and a cell plate provided with a plurality of apertures supported by and frictionally engaging said carrier, in combination with a plurality of dentils upon said cell plate, and means for periodically engaging said dentils to stop the plate and momentarily control the position of said apertures.

4. In a device of the kind described, a stationary spindle, a rotatable carrier mounted upon said spindle, mechanism for continuously rotating said carrier and a cell plate, provided with a plurality of apertures, supported by and frictionally engaging said carrier, in combination with a plurality of dentils positioned at the periphery of said cell plate, and means controlled by said rotating mechanism for periodically engaging said dentils to stop the plate and momentarily control the position of said apertures.

5. In a device of the kind described, a stationary spindle, a rotatable carrier mounted upon said spindle, mechanism for continuously rotating said carrier and a cell plate, provided with a plurality of apertures, supported by and frictionally engaging said carrier, in combination with a plurality of dentils upon said cell plate one for each aperture, and means for periodically engaging said dentils to stop the plate and momentarily control the position of said apertures.

6. In a device of the kind described, a stationary spindle, a rotatable carrier mounted upon said spindle, mechanism for continuously rotating said carrier and a cell plate, provided with a plurality of apertures arranged concentrically of said plate near its periphery, supported by and frictionally engaging said carrier and adjustable resilient and stationary means for controlling the frictional engagement between said cell plate and said carrier, in combination with a plurality of dentils upon said cell plate and means for periodically engaging said dentils to stop the plate and momentarily control the position of said apertures.

7. In a device of the kind described, a stationary spindle, a rotatable carrier mounted upon said spindle, mechanism for continuously rotating said carrier and a cell plate provided with a plurality of apertures arranged concentrically of said plate near its periphery, supported by and frictionally engaging said carrier and adjustable resilient and stationary means for controlling the frictional engagement between said cell plate and said carrier, in combination with a plurality of dentils positioned at the periphery of said cell plate one for each aperture, and means controlled by said rotating mechanism for periodically engaging said dentils to stop the plate and momentarily control the position of said apertures.

8. In a device of the kind described, a stationary spindle, a rotatable carrier mounted upon said spindle, mechanism for continuously rotating said carrier and a cell plate, provided with a plurality of apertures, supported by and frictionally engaging said carrier, and adjustable resilient and stationary means for controlling the frictional engagement between said cell plate and said carrier, in combination with a plurality of dentils upon said cell plate and means controlled by said rotating mechanism for periodically engaging said dentils to stop the plate and momentarily control the position of said apertures.

9. In a device of the kind described, a movable cell plate provided with a plurality of transverse fruit receiving apertures and stationary means positioned at each side of said cell plate arranged to temporarily close both ends of said apertures.

10. In a device of the kind described, a movable cell plate provided with a plurality of transverse fruit receiving apertures of substantially uniform cross section and stationary means positioned at each side of said cell plate arranged to temporarily close both ends of said apertures.

11. In a device of the kind described, a movable cell plate provided with a plurality of transverse fruit receiving apertures arranged concentrically of said cell plate near its periphery and stationary means positioned at each side of said cell plate arranged to temporarily close both ends of a part of said apertures.

12. In a device of the kind described, a rotatable cell plate provided with a plurality of transverse apertures of substantially uniform cross section arranged concentrically of said plate near its periphery and stationary means positioned at each side of said cell plate arranged to temporarily close both ends of a part of said apertures.

13. In a device of the kind described, a pair of stationary parallel members suitably spaced from each other, in combination with a rotatable cell plate provided with a plurality of transverse fruit receiving apertures positioned in, and substantially filling the space, between said members with both ends of a part of said apertures closed by said members, and means for periodically moving said cell plate.

14. In a device of the kind described, a pair of stationary parallel members suitably spaced from each other with an opening through said members positioned in transverse alinement with each other, in combination with a rotatable cell plate provided with a plurality of transverse fruit receiving apertures positioned in, and substantially filling the space, between said members with both ends of a part of said apertures closed by said members, and means for periodically moving said cell plate.

In testimony whereof I have hereunto set my hand in presence of two subscribing witnesses.

JASPER H. STANFIELD.

Witnesses:
ALBERT J. WACHSMUTH,
LOUIS P. HEERES.

Copies of this patent may be obtained for five cents each, by addressing the "Commissioner of Patents, Washington, D. C."